United States Patent
Li et al.

(10) Patent No.: US 8,236,276 B2
(45) Date of Patent: Aug. 7, 2012

(54) SYSTEM AND METHOD FOR SULFUR RECOVERY

(75) Inventors: Xianming Jimmy Li, Orefield, PA (US); Elmo Nasato, Oakville (CA); Jung Soo Choe, Gwynedd Valley, PA (US)

(73) Assignee: Fluor Enterprises, Inc., Irving, TX (US)

( * ) Notice: Subject to any disclaimer, the term of this patent is extended or adjusted under 35 U.S.C. 154(b) by 0 days.

(21) Appl. No.: 12/709,745

(22) Filed: Feb. 22, 2010

(65) Prior Publication Data

US 2011/0206601 A1    Aug. 25, 2011

(51) Int. Cl.
*B01J 19/00* (2006.01)
*C01B 17/00* (2006.01)

(52) U.S. Cl. .................. 423/573.1; 423/576.2; 422/108; 422/129; 422/168; 422/169; 422/176; 422/177; 422/187

(58) Field of Classification Search .................. 422/108, 422/129, 168, 169, 176, 177, 187; 423/573.1, 423/576.2
See application file for complete search history.

(56) References Cited

U.S. PATENT DOCUMENTS

| | | | |
|---|---|---|---|
| 3,026,184 A | 3/1962 | Karasek | |
| 3,848,071 A | 11/1974 | Groenendaal | |
| 3,871,831 A | 3/1975 | Andral et al. | |
| 3,904,370 A | 9/1975 | Robison | |
| 4,438,069 A | 3/1984 | Peterman et al. | |
| 4,552,747 A | 11/1985 | Goar | |
| 4,632,818 A | 12/1986 | Chen et al. | |
| 5,266,274 A * | 11/1993 | Taggart et al. | 422/112 |
| 6,287,535 B1 | 9/2001 | Schendel | |
| 6,508,998 B1 | 1/2003 | Nasato | |
| 7,597,871 B2 | 10/2009 | Ferrell | |
| 7,597,872 B2 | 10/2009 | Carrette et al. | |
| 2006/0153767 A1 | 7/2006 | Farrell | |

FOREIGN PATENT DOCUMENTS

| | | |
|---|---|---|
| RU | 56207 | 10/2006 |
| WO | 00/59826 A1 | 10/2000 |

OTHER PUBLICATIONS

Korens, et al; SFA Pacific, Inc. Final Report for DOE; "Process Screening Analysis of Alternative Gas Treating and Sulfur Removal for Gasification;" Dec. 2002.

* cited by examiner

*Primary Examiner* — Timothy Vanoy
(74) *Attorney, Agent, or Firm* — Fish & Associates, PC (57) ABSTRACT

A sulfur recovery system for recovering sulfur from a sulfur plant feed stream including a first sulfur removal system and a second sulfur removal system. The system includes a sulfur plant feed inlet to the first sulfur removal system, the sulfur plant feed inlet being capable of providing a sulfur plant feed stream at a first pressure. One or more oxidizing gas inlets are arranged and disposed to combine at least one oxidizing gas stream with the sulfur plant feed stream to form a combustion gas for combustion in the first sulfur removal system at a second pressure. A flow restriction device is operably configured to control an operating pressure in one or both of the first sulfur removal system and the second sulfur removal system. A gas processing plant and method for recovering sulfur from a sulfur plant feed stream are also disclosed.

27 Claims, 4 Drawing Sheets

SYSTEM AND METHOD FOR SULFUR RECOVERY

BACKGROUND OF THE INVENTION

The present invention is directed to system and methods for recovering elemental sulfur from sulfur containing gas streams. More specifically, the present invention is directed to improvements in sulfur recovery by controllably increasing operating pressures.

A sulfur recovery unit (SRU) in a petroleum refinery converts hydrogen sulfide ($H_2S$) to liquid elemental sulfur for further processing or storage and serves as the cleanup stage for the refineries. As available crude oil for refining gets increasingly sour, and while gasoline and diesel sulfur specifications continue to decrease due to tighter environmental regulations, an increased amount of sulfur must be processed in the refining process.

Claus sulfur recovery systems are utilized to recover sulfur from acid gas-containing sulfur plant feed stream produced in natural gas purification, gasification of solid feedstocks, and in petroleum refineries, primarily from amine sweetening. In refineries, the hydrogen sulfide is in crude oil and is contained in hydrocarbon desulfurization unit off gases and fluidized catalytic cracker unit off gases. Often times the acid gas stream produced from the amine unit is quite rich in hydrogen sulfide, particularly in petroleum refineries, where it may be 80-95 mole % hydrogen sulfide. With the known reserves of refinable hydrocarbons and crude oils decreasing, less attractive known oil reserves are now being processed, such less attractive oil reserves typically have high sulfur content. The trend in refining such high sulfur containing feedstocks may increase in the future. In refineries, an additional source of $H_2S$ that is fed to the sulfur recovery unit is generated in the sour water stripper. The sour water stripper gas stream feed to the sulfur recovery unit typically contains ⅓ $H_2S$, ⅓ $NH_3$ and ⅓ water vapor with trace amounts containing, but not limited to, contaminants such as $CO_2$, phenol, light hydrocarbons. Therefore, a method for increasing the capacity of Claus plants to process sulfur is needed.

Although the foregoing discussion pertains to sulfur from oil refineries, other sources of sulfur can come from natural gas processing, gasification of solid feedstocks (such as coal, petcoke, biomass, and others) and other desulfurization operations. The concentration of hydrogen sulfide in the sulfur plant feed stream can vary from dilute (less than 50 mole %) to more than 90 mole %.

U.S. Pat. No. 4,552,747, which is hereby incorporated by reference in its entirety, discloses a method of increasing Claus plant capacity with oxygen enrichment and furnace gas recycle to moderate furnace temperatures. U.S. Pat. No. 6,508,998, which is hereby incorporated by reference in its entirety, discloses an improvement to U.S. Pat. No. 4,552,747 whereby the recycled gas is being supplied by a steam-driven eductor rather than a mechanical blower.

U.S. Pat. No. 4,632,818, which is hereby incorporated by reference in its entirety, discloses a method of increasing Claus plant capacity with oxygen enrichment and liquid sulfur recycle and injection in to the combustion zone to moderate furnace temperatures.

U.S. Pat. No. 7,597,871, which is hereby incorporated by reference in its entirety, discloses a method to increase Claus plant capacity by oxygen enrichment with steam injection to moderate furnace temperature. The steam is generated from the sulfur recovery unit 100, and may have been used previously for the eductor operation.

What is needed is a method and system for sulfur recovery that provides more efficient sulfur removal, with greater process control and does not require the capital-intensive equipment or complicated processes.

BRIEF SUMMARY OF THE INVENTION

The instant invention solves problems associated with conventional sulfur recovery and removal systems by providing enhanced process control including pressure control, among other benefits. The inventive processes can be employed for treating a sulfur containing stream including a sulfur plant feed stream in order to recover sulfur-containing species including elemental sulfur. By "sulfur plant feed stream" it is meant to refer to a stream comprising but not limited to $H_2S$, $CO_2$, light hydrocarbons, aromatics, mercaptans, $NH_3$, $H_2O$, mercury, and cyanides. By "elemental sulfur" it is meant to refer to a stream comprising of substantially pure sulfur. By "liquid sulfur" it is meant to refer to a stream comprising substantially pure sulfur in the liquid phase.

One aspect of the present invention includes a sulfur recovery system for recovering sulfur from a sulfur plant feed stream including a first sulfur removal system and a second sulfur removal system. The system includes a sulfur plant feed inlet to the first sulfur removal system, the sulfur plant feed inlet being capable of providing the sulfur plant feed stream at a first pressure. One or more oxidizing gas inlets are arranged and disposed to combine at least one oxidizing gas stream with the sulfur plant feed stream to form a combustion gas for combustion in the first sulfur removal system at a second pressure. A flow restriction device is operably configured to control an operating pressure in one or both of the first sulfur removal system and the second sulfur removal system.

Another aspect of embodiments of the present invention includes a gas processing plant having a system for processing natural gas that produces natural gas and a sulfur plant feed stream and a sulfur recovery system for recovering sulfur from the sulfur plant feed stream. The sulfur recovery system includes a first sulfur removal system and a second sulfur removal system. The system includes a sulfur plant feed inlet to the first sulfur removal system, the sulfur plant feed inlet being capable of providing a sulfur plant feed stream at a first pressure. One or more oxidizing gas inlets are arranged and disposed to combine at least one oxidizing gas stream with the sulfur plant feed stream to form a combustion gas for combustion in the first sulfur removal system at a second pressure. A flow restricting device is operably configured to control an operating pressure in one or both of the first sulfur removal system and the second sulfur removal system.

Still another aspect of embodiments of the present invention includes a method for recovering sulfur from a sulfur plant feed stream. The method includes providing a first sulfur removal system and a second sulfur removal system and providing the sulfur plant feed stream at a first pressure. The sulfur plant feed stream is combined with one or more oxidizing gases to form a combustion gas. The combustion gas is combusted at a second pressure. An operating pressure is controlled in one or both of the first sulfur removal system and the second sulfur removal system with a flow restriction device in response to the first pressure and second pressure. Other features and advantages of the present invention will be apparent from the following more detailed description of the preferred embodiment, taken in conjunction with the accompanying drawings which illustrate, by way of example, the principles of the invention.

BRIEF DESCRIPTION OF SEVERAL VIEWS OF THE DRAWINGS

Wherever possible, the same reference numbers will be used throughout the drawings to represent the same parts.

DETAILED DESCRIPTION OF THE INVENTION

Provided is a method and system for sulfur recovery that provides more efficient sulfur removal, with greater process control and does not require additional capital-intensive equipment or complicated processes. Furthermore, a method and system is provided that provides an efficient sulfur recovery system that can be used with combination of amine acid gas, sour water stripper acid gas, combustion air and/or oxygen-enrichment operation. The systems according to the present invention are suitable for installation in a refinery, natural gas plant, coal gasification, steel plant or any facility that implements a sulfur recovery process based on Claus or Claus-like technology. The embodiments described herein are applicable collectively or as individual aspects to any such suitable installation.

Embodiments of the present invention may include increased capacity, including capacity increases from about 6% to about 10%, improved sulfur recovery efficiency due to improved catalytic activity and tail gas unit performance, increased process control, lower sulfur vapor losses in the sulfur recovery unit tail gas stream, lower liquid sulfur entrainment losses in the tail gas stream due to reduced gas velocities. These benefits can be achieved over known systems and methods, and/or result in the reduction or elimination of substantial operating cost over known sulfur removal systems.

Figure 1:
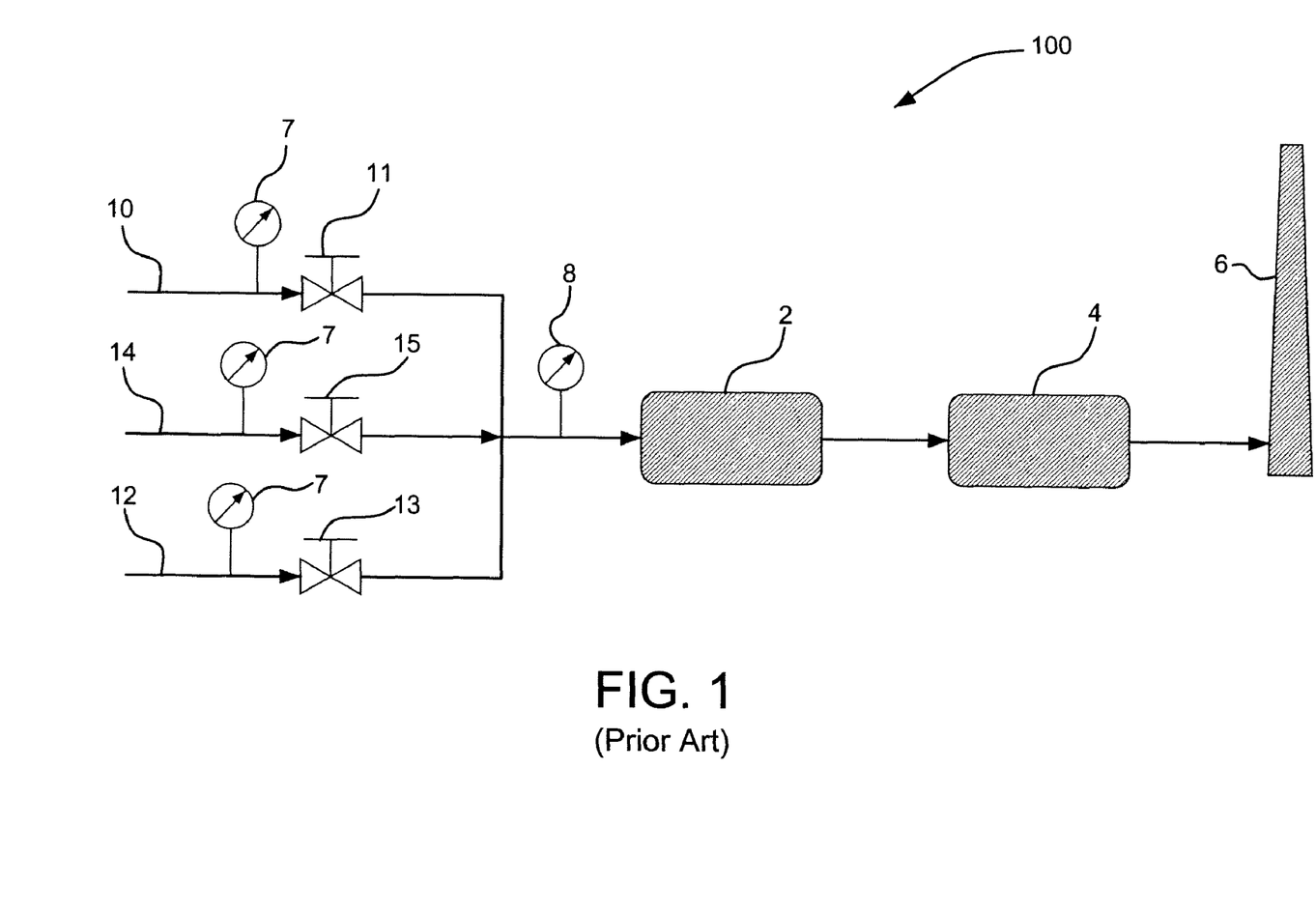
FIG. 1 shows a schematic representation of the operation of a known sulfur recovery unit.

A known sulfur recovery unit 100 is shown in FIG. 1. As shown in FIG. 1, the sulfur recovery unit 100 includes a first sulfur removal system 2 and a second sulfur removal system 4. In addition, an incinerator and/or stack system 6 is typically provided. Operation of a known sulfur recovery unit 100 is shown in FIG. 1. In a known sulfur recovery unit operation such as the unit depicted in FIG. 1, the measured pressure at pressure monitoring device 8 is based on the system hydraulics as based on cumulative pressure loss of equipment and process piping for the given hydraulic load.

The sulfur plant feed inlet 10 provides a sulfur plant feed stream from an amine gas unit, a sour water stripper unit and/or other source of acid gas (not shown). In one embodiment, the amine acid gas unit is an acid gas removal unit, typically an amine unit, of a natural gas processing plant. In one embodiment, the sulfur plant feed stream is a combination of amine acid gas from an amine unit and sour water stripper acid gas from a sour water stripper unit. In addition, the sulfur plant feed stream may include other feeds, such as natural gas. The sulfur plant feed stream may include, for example, hydrogen sulfide, carbon dioxide, light hydrocarbons, mercaptans and other natural occurring constituents of a natural gas stream. The sulfur plant feed stream is provided at a first pressure monitored at pressure monitoring devices 7, respectively. It will be understood that the term "monitor", "monitoring" and grammatical variations thereof is intended to encompass determine, identify, measure, show, or any other suitable method of obtaining pressure data. The first pressure is measured at one of pressure monitoring devices 7. In one embodiment, the first pressure will be the sulfur plant feed stream and may correspond to the pressure of the amine gas unit (not shown), which may be, for example, about 28 psia.

Figure 2:
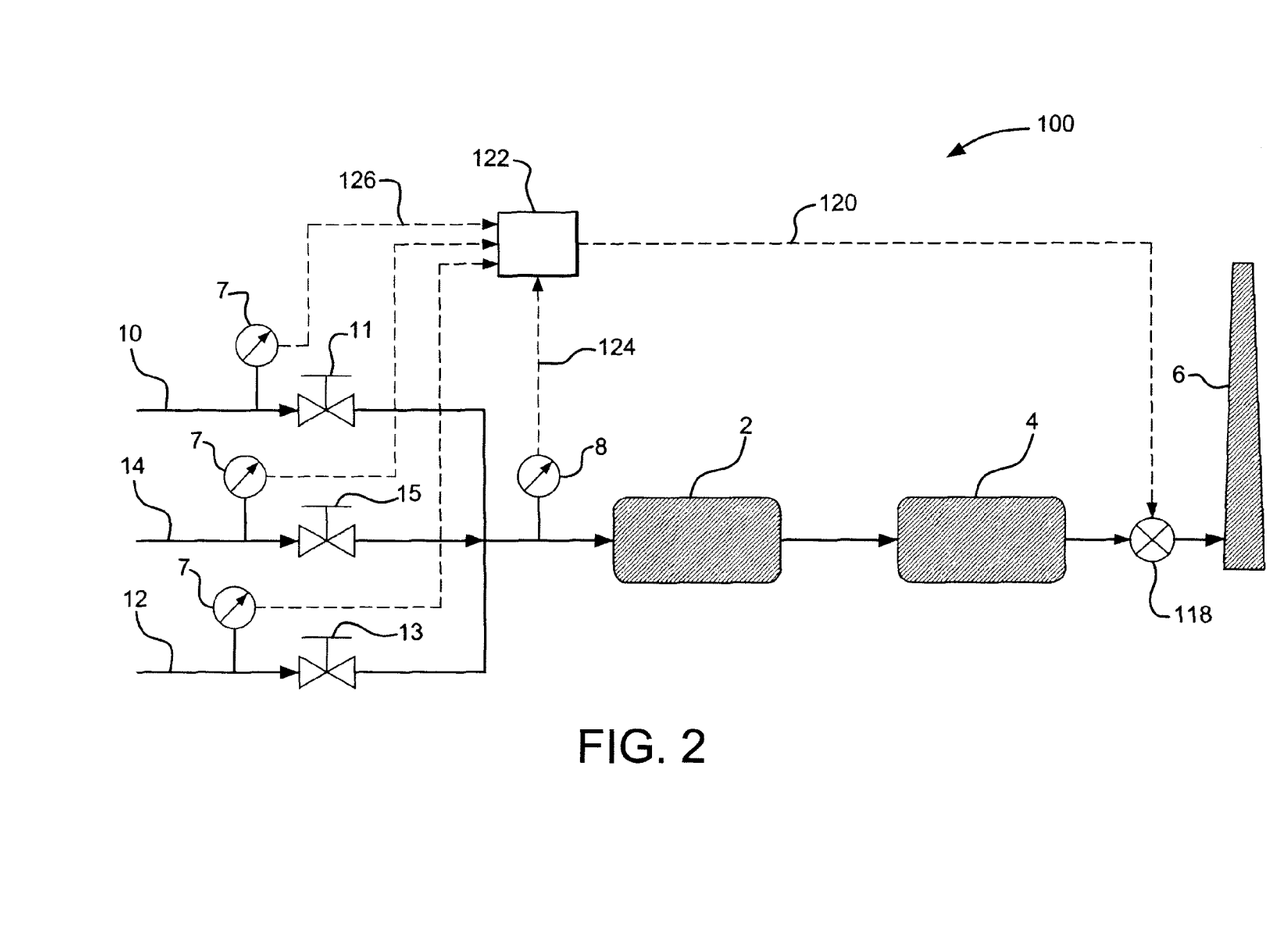
FIG. 2 shows a schematic representation of the operation of an exemplary sulfur recovery unit according to an embodiment of the present invention.
Figure 3:
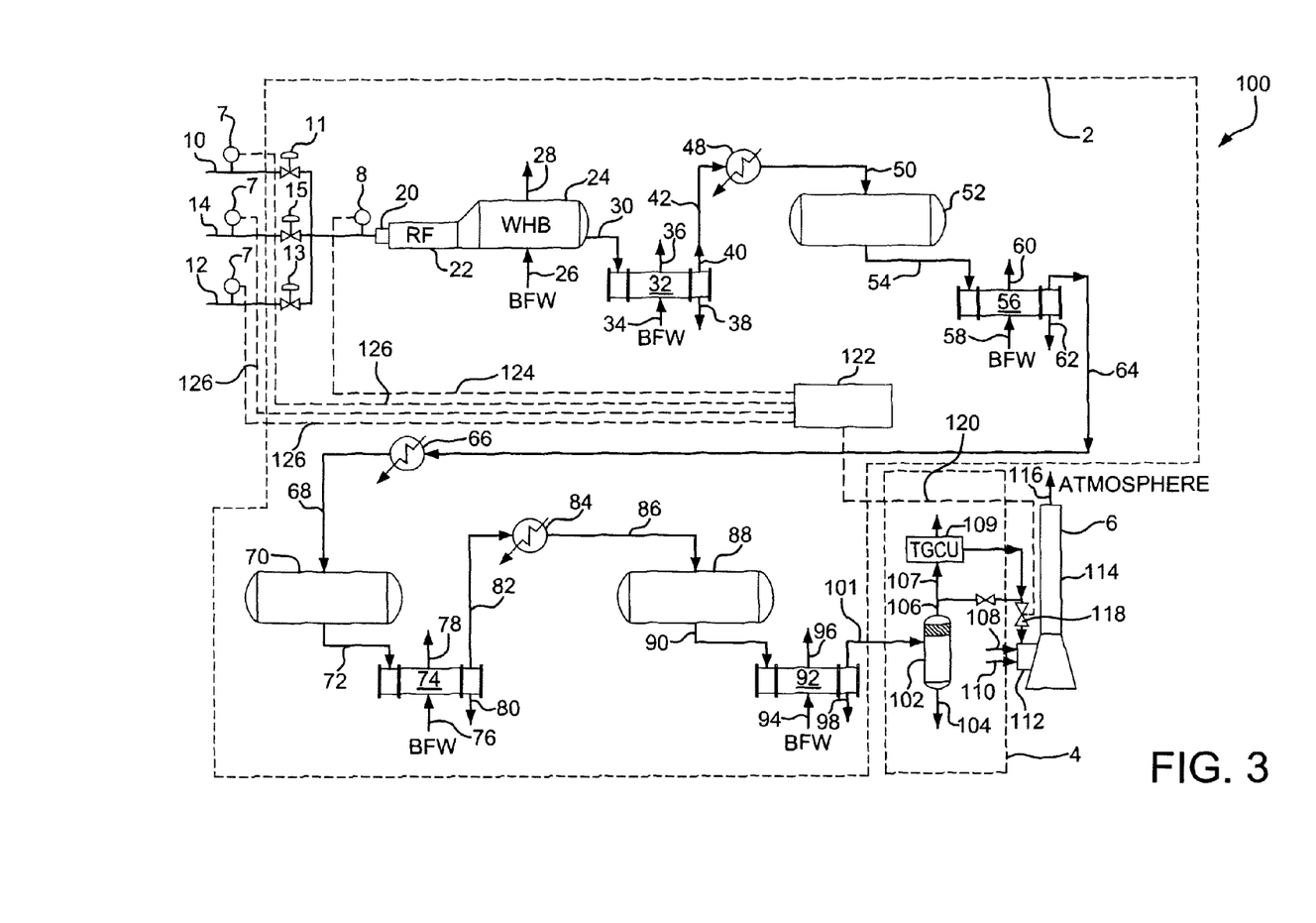
FIG. 3 shows a sulfur recovery unit system according to one embodiment of the present invention.

As shown in FIGS. 1 and 2, the first sulfur removal system 2 may be a Claus plant system and may include a reaction furnace 22 (see for example FIG. 3) for combusting the acid gas or gases in the presence of oxidizing gases to react and form sulfur and a series of catalytic reactors 52, 70 and 88, which further react with the gas from the reaction furnace 22 to form sulfur (see for example FIG. 3). Plant operators of known sulfur recovery units 100, such as the arrangement shown in FIG. 1, maintain the reaction furnace 22 of the first sulfur removal system 2 at a second pressure monitored at second pressure monitoring device 8. The second pressure may be about 24 psia, which includes a reduction in pressure of about 4 psi across a control valve 11 to maintain sufficient margin for control and as dictated by the hydraulic pressure profile of the system 2 and, if applicable, system 4. These are fixed bed horizontal reactors with most commonly utilizing alumina catalyst but can also use titania based catalyst.

As shown in FIGS. 1 and 2, air inlet 14, provides air or other oxidizing gas, and, optionally an oxygen inlet 12 provides an oxygen stream. The air inlet 14 and oxygen inlet 12 are controlled with control valve 15 and control valve 13, respectively, to achieve an operating pressure. The oxygen concentration typically ranges from about 90 to about 95 volume percent.

Air provided in air inlet 14 may be compressed by a mechanical blower or other suitable device to achieve the sulfur plant feed inlet 10 pressure. Additionally, an oxygen stream may be compressed to achieve the sulfur plant feed inlet 10 pressure. The operating pressure of the first sulfur removal system 2 corresponds to the pressure measured at pressure monitoring device 8, which further corresponds to the inlet pressure to the reaction furnace. This pressure is related to the hydraulic resistances that exist in the various equipment in the first sulfur removal system and, if applicable, the second sulfur removal system 4. That is, the reaction furnace pressure as measured at pressure monitoring device 8 provides the system pressure of the first sulfur removal system 2. In addition, other downstream units, such as the second sulfur removal system 4 may also be affected by the system pressure. The supply pressures of all the feed stream inlets 10, 12, 14 are greater than the pressure as measured at point 8 during operation and the control valves 11, 15, 13 modulate the feed streams to satisfy the system hydraulics or other operational constraints.

In order to process a greater volume of sulfur, it is desirable to increase the sulfur plant feed and the corresponding amount of air provided to the system. However, the processing capacity of the first sulfur removal system 2 and the second sulfur removal system 4 is constrained by the available supply pressures of all the feed streams including the sulfur plant feed stream to overcome the overall hydraulic resistances in the system. That is, the lowest supply pressure of inlets 10, 14 and optional oxygen inlet 12 corresponds to a potential operating pressure after control pressure losses and hydraulic or other pressure losses are taken into account. In certain embodiments, the sulfur plant feed stream pressure at sulfur plant feed inlet 10 can only be increased to a certain limit depending on the type of amine that is being utilized, typically a maximum of about 28 psia because higher pressure can adversely impact the performance of the upstream amine gas unit. As such the system pressure is limited by the inlet pressures.

FIG. 2 shows a sulfur recovery unit 100 according to an embodiment of the present invention. The first sulfur removal system 2 may be a Claus plant and may include a reaction furnace 22 (see for example FIG. 3) for combusting the acid gas in the presence of oxidizing gases to react and form sulfur and a series of catalytic reactors 52, 70 and 88, which further react with the gas from the reaction furnace 22 to form sulfur (see for example FIG. 3). The second sulfur removal system 4 includes a tail gas cleanup unit (TGCU) 109 (see for example FIG. 3), which includes conventional tail gas cleanup units, which includes but is not limited to, hydrogenation-amine units, direct oxidation reactors and/or subdewpoint systems (see for example FIG. 3) or other devices that are capable of removing sulfur and other materials from the gas stream (e.g. U.S. Pat. No. 3,848,071, hereby incorporated by reference, discloses a catalytic process known as the SCOT process by Shell Oil Company, and "Process screening analysis of alternative gas treating and sulfur removal for gasification", a final report to U.S. Department of Energy by SFA Pacific Inc., Dec. 2, 2002, for Task Order No. 739656-00100 summarizes the commercially prevalent approaches for tail gas cleanup) The second sulfur removal system 4 may include alternate venting or configuration of cleanup units may be provided. In certain embodiments, the second sulfur removal system is the incinerator/stack system 6 or other venting or cleanup system. In contrast to the known system of FIG. 1, the system according to the present invention shown in FIG. 2 includes a flow restriction device 118. In the embodiment shown in FIG. 2, the flow restriction device 118 is disposed between the second sulfur removal system 4 and the incinerator/stack system 6. The flow restriction device 118 may be any suitable flow restriction device for use with gas streams. Suitable flow restriction devices 118 may include, but are not limited to, dampers, valves, movable gates, movable shutter, or other flow restriction devices known for restricting flow of heated gasses. As shown in FIG. 2, sulfur plant feed inlet 10 provides the sulfur plant feed stream at the first pressure monitored by pressure monitoring device 7. The first pressure corresponds to an operating pressure of an amine acid gas unit, sour water stripper acid gas unit and/or other acid gas providing plant (not shown). For example, the first pressure for an amine acid plant and/or sour water stripper acid gas plant may be about 28 psia. In embodiments of the present disclosure, the flow restricting device restricts the flow of gas such that the second pressure monitored by pressure monitoring device 8 is adjusted to within 10% or within 5% or within 1% or is substantially equal to the first pressure. In one embodiment, the second pressure is maintained at about 27.5 psia. A second pressure that more closely approximates the first pressure permits higher pressure operation of the first sulfur removal system 2 and the second sulfur removal system 4.

The flow restriction device 118 may be controlled by controller 122, which determines positions and amount of flow restriction based upon inputs of the first pressure and second pressure. Signals corresponding to first pressure determined by first pressure monitoring devices 7 and second pressure by second pressure monitoring device 8 may be provided by the first pressure sensor lines 126 and second pressure sensor line 124, respectively. The first pressure preferably corresponds to the lowest pressure measured on inlet lines 10, 14, 12 at pressure monitoring devices 7. In one embodiment, the first pressure is measured on sulfur plant feed inlet 10 at the pressure monitoring device 7. A control line 120 may provide a control signal or other control command to configure the flow restriction device 118. In one embodiment, the controller 122 will configure the flow restriction device 118 to provide a pressure drop that provides a second pressure that is approximately the same as the first pressure. The gas pressure in the incinerator/stack system 6 is at or about atmospheric pressure. The placement and configuration of the flow restriction device 118 provides limited pluggage potential, permitting extended lives and reliable operation. The combination of flow restriction device 118 with process control algorithms provided by controller 122 permit control of the system pressure such that the operating pressure may be maintained effectively even if substantially no pressure drop is incurred across control valve 11. While FIG. 2 has been shown as having a particular arrangement of control valves and inlet streams, alternate arrangements that provide controlled flow of acid gas and oxidizing agents, such as air or oxygen may be utilized with the present invention. In addition, while the above embodiment has been shown as a controller 122 controlling flow restriction device 118, the control of flow restriction device 118 may be provided in an alternate manner, such as by manual control or by other control means that can be provided in response to the determinations of the first pressure and/or the second pressure.

In one embodiment, the flow restriction device 118 is disposed downstream of the second sulfur removal system 4, whereby manipulating the pressure will maximize the increased pressure benefits for both the system 2 and system 4.

In an alternate embodiment, controller 122 may control both the flow restriction device and feed control valves 11, 13, and 15 simultaneously to maintain a set point of second pressure monitored by second pressure monitoring device 8 (see FIG. 2). In one embodiment, the controller 122 may provide signals or control mechanisms to both the feed control valves 11, 13, 15 and flow restriction device 118, controlling each simultaneously to maintain the second pressure at a predetermined pressure, for example, about 27 psia. Further, controller 122 may provide control signals or control mechanisms to each of flow restriction device 118, control valve 11, control valve 13 and control valve 15 to provide further control to the sulfur recovery unit 100 to maintain a predetermined second pressure at second pressure monitoring device 8.

Further details of the invention can be appreciated with an example shown in FIG. 3. In the discussions to follow, operating parameters such as pressure, temperature, composition and flow rates are meant for illustration and clarification of the invention, thus should not be construed as limiting the invention. FIG. 3 shows a sulfur plant feed inlet stream 10 introduced into the sulfur recovery unit 100. In one embodiment the sulfur plant feed stream includes a hydrogen sulfide content from about 60 mole % to about 100 mole %, typically from about 80 mole % to about 100 mole %, and commonly at about 92 mole %. If desired, a concentrating unit (not shown) upstream can be used to achieve such hydrogen sulfide levels. The feed stream may be at a temperature from about 60° F. to about 150° F. (15 to 66° C.), preferably from about 90° F. to about 120° F. (32 to 49° C.), and typically at about 100° F. (37.8° C.) and a pressure from about 20 psia to about 30 psia and at typically about 27 psia. The stream is introduced into burner 20 along with air provided in inlet line 14 at elevated pressure, as well as an optional oxygen stream provided by oxygen inlet 12 provided from any suitable source of commercially pure oxygen. Control valves 11, 15, 13 provide feed control to the sulfur plant feed inlet 10, the air inlet 14 and the oxygen inlet 12, respectively. Other bypass or recycle streams may be provided between the first pressure monitoring device 7 and the second pressure monitoring devices on one or more of sulfur plant feed inlet 10, air inlet 14 and oxygen inlet 12. The reactants are combusted in burner 20 and evolved into the reaction furnace 22 where oxidation of contaminants, dissociation of $H_2S$ and the reactions of the Claus process occur. Specifically, in the burner, hydrogen sulfide and oxygen combine to produce sulfur dioxide and water wherein approximately one third of the reaction feed is initially combusted and the remaining feed reacts with the sulfur dioxide produced to produce sulfur and water according to the following formulas:

$$H_2S + 3/2O_2 \rightarrow SO_2 + H_2O$$

$$2H_2S + SO_2 \rightarrow 3/2S_2 + 2H_2O$$

Some sulfur and hydrogen is also produced by hydrogen sulfide dissociation.

$$2H_2S \rightarrow 2H_2 + S_2$$

The elevated operating pressure (e.g., about 27 psia), in the first sulfur removal system 2 and the second sulfur removal system 4 decreases the volume of the gas stream. Therefore, the elevated operating pressure increases the system capacity compared to the lower pressure of the system shown and described with respect to FIG. 1 wherein a hydraulic limit is not reached. The total system hydraulic resistance can be expressed in terms of a velocity head as follows:

$$\Delta p = k \frac{1}{2} \rho V^2$$

where k is a multiple of velocity head. The ideal gas law states that density is directly proportional to system pressure, $\rho = p/RT$. The processing capacity, or mass flow of the gas stream, is the product of gas density, gas velocity and cross sectional area: $\dot{m} = \rho V A$. Therefore, for a given hydraulic limit $\Delta p$, the processing capacity is:

$$\dot{m} = A\sqrt{2(\Delta p)\rho/k} \propto \sqrt{\rho} \propto \sqrt{p}$$

where $\rho$ is the absolute pressure of the system. As utilized herein, the symbol $\propto$ means "proportional to." This expression states that the sulfur processing capacity for a given hydraulic limit is proportional to the square root of the system absolute pressure. In sulfur recovery units 100 according to the present invention, if the second pressure monitored at second pressure monitoring device 8 is elevated, for example, from 24 psia to 27 psia, the capacity increase is: $\sqrt{27/24} - = 6.1\%$.

In addition to the above advantages, elevated operating pressure of the first sulfur removal system 2 increases the opacity of the gases in the reaction furnace 22, thus shielding the refractory walls from the high temperature flame zone, and increasing the refractory life. In the reaction furnace 22, the high temperature flame zone is surrounded by furnace gases, but radiation passes through the gases to heat up the refractory walls. The increased opacity of the gas blocks a greater amount of radiation from the flame zone so that less heat reaches the refractory walls and peak wall temperature is lower. Gas opacity is characterized by the product of gas density and mean beam length, the latter being a geometric factor. Since there are no changes in furnace geometry, the mean beam length is unchanged. Thus, the opacity is directly related to gas density which, in turn, is directly proportional to gas pressure. For example, in the embodiment wherein the second pressure monitored by second pressure monitoring device 8 is 27 psia, the resulting opacity in the reaction furnace 22 is increased 12.7%.

A benefit over known systems and methods of operation is improved sulfur recovery. While not wishing to be bound by theory, the improved sulfur recovery is believed to be achieved due to the elevated pressure which improves Claus reaction kinetics, for example, through the Le Chatelier principle, increases residence time, reduces reactor space velocity, reduces condenser gas velocities thus reducing liquid sulfur entrainment and reduces sulfur vapor losses due to the increased elevated operating pressure. Higher system pressure increases gas density, thus reduces flow velocities. Low gas velocities increase reactor residence time and reduce space velocity which, in turn, improves reactor conversion efficiency. Low velocities also reduce liquid sulfur entrainment and carryover and lead to lower stack emissions. In the context of higher system pressure to enable higher throughput, these characteristics improve sulfur recovery performance due to the higher throughput. That is, higher system pressure allows the sulfur recovery unit to operate at higher throughput with performances similar exceeding those at a lower operating pressure.

As shown in FIG. 3, the reactor furnace effluent then passes through a heat exchange zone or waste heat boiler 24 wherein the combustion effluents are cooled against boiler feed water in line 26 which then produces steam in line 28. In the waste heat boiler 24, the reaction effluents are converted from one form of sulfur species to another according to the following equations:

$$S_2 \rightarrow \tfrac{1}{3}S_6$$

$$S_2 \rightarrow \tfrac{1}{4}S_8$$

The cooled effluent from the waste heat boiler in line 30 may be present at a temperature from about 450° F. to about 750° F. (232 to 399° C.), preferably from about 550° F. to about 650° F. (288 to 343° C.), and typically at about 600° F. (315.6° C.) and a pressure from about 20 psia to about 27 psia and typically at about 24 psia. The effluent is then introduced into the first condenser 32 wherein heat is transferred from the effluent to boiler feed water in line 34 which produces steam in line 36. Liquid sulfur condenses in line 38 constituting about 60 wt % to about 80 wt % and typically about 77 wt % of the sulfur in the feed, and the gaseous combustion effluent stream is removed in line 40 at a temperature from about 330° F. to about 390° F. (166 to 199° C.), preferably about 350° F. to about 370° F. (177 to 188° C.), and a pressure from about 19 psia to about 25 psia, and preferably from about 21 psia to about 23 psia.

As shown in FIG. 3, the stream in line 42 is then reheated by an indirect reheater heat exchanger 48 or direct fired reheater. The stream now in line 50 has been reheated to a temperature from about 400° F. to about 500° F. (204 to 260° C.) and typically of about 430° F. (221.1° C.) and is then introduced into a catalytic reactor 52 (e.g., employing an alumina based catalyst) wherein additional quantities of hydrogen sulfide and sulfur dioxide are reacted to produce sulfur and water in accordance with the previous equations. As shown in FIG. 3, the reacted stream in line 54 is introduced into a second condenser 56 which again cools the effluent stream with boiler feed water in line 58 to produce additional steam in line 60. Additional elemental sulfur is recovered in line 62 constituting from about 10 wt % to about 20 wt %, and typically about 14 wt % of the sulfur in the feed to the process, wherein the sulfur species produced in the catalytic reaction are converted to high molecular weight sulfur species such as $S_6$ and $S_8$ and then are condensed to elemental sulfur according the following reactions:

$$S_6 \rightarrow 6S_1$$

$$S_8 \rightarrow 8S_1$$

The elevated system pressure also increases the catalyst reactor conversion in the catalytic reactors 52, 70 and 88 (see for example FIG. 3). In the catalytic reactors, the following reactions may occur:

$$12H_2S + 6SO_2 \rightarrow 3S_6 + 6H_2O$$

$$16H_2S + 8SO_2 \rightarrow 3S_8 + 16H_2O$$

Because the reactions have fewer molar volumes in the products, the increased second pressure monitored by second pressure monitoring device 8 increases the operating pressure in catalytic reactors 52, 70 and 88, and drives the reactions to further completion.

The stream in line 64 is at a temperature from about 310° F. to about 370° F. (154 to 188° C.), preferably from about 330° F. to about 350° F. (166 to 177° C.), and typically about 340° F. (171.1° C.) and a pressure from about 18 psia to about 24 psia, preferably from about 20 psia to about 22 psia, and typically about 22 psia. The stream is introduced into reheater heat exchanger 66 and heated with process steam to produce a stream in line 68 from about 400° F. to about 460° F. (204 to 238° C.), preferably from about 420° F. to about 440° F. (216 to 227° C.), and typically at about 420° F. (215.6° C.). Alternatively other indirect or direct reheat methods may also be utilized. This stream is introduced into a second catalytic reactor 70 wherein a similar catalytic reaction between hydrogen sulfide and sulfur dioxide occurs with the effluent in line 72 going to yet another condenser 74 which is cooled with boiler feed water in line 76 to produce steam in line 78. An additional quantity of liquid elemental sulfur is removed in line 80 constituting from about 3 wt % to about 10 wt %, and typically about 5 wt % of the sulfur in the feed to the process.

The effluent stream in line 82 is at a temperature from about 300° F. to about 370° F. (149 to 188° C.), preferably from about 330° F. to about 350° F. (166 to 177° C.), and typically of about 330° F. (165.6° C.) and a pressure from about 17 psia to about 22 psia, preferably from about 18 psia to about 21 psia, and typically of about 20 psia, and with approximately 5 wt % sulfur from the feed remaining before it is reheated in reheater heat exchanger 84 with process steam (or alternative reheat method) to produce a stream in line 86 at a temperature from about 370° F. to about 420° F. (188 to 216° C.), preferably from about 390° F. to about 410° F. (199 to 210° C.), and typically of about 400° F. (204.4° C.) and about 20 psia. This stream is introduced into the third and final catalytic reactor 88 to react substantially the remaining hydrogen sulfide and sulfur dioxide to produce sulfur species which are removed in line 90 wherein that stream is introduced into a condenser 92 cooled by boiler feed water in line 94 producing steam in line 96. Further elemental sulfur in liquid form is removed in line 98 constituting from about 1 wt % to about 5 wt %, and typically about 2 wt % of the sulfur in the feed to the process, while a final effluent is recovered in line 101 comprising predominantly water vapor, nitrogen, carbon dioxide, hydrogen and residual hydrogen sulfide and sulfur compounds amounting to 1-2 mole % of the effluent stream.

As shown in FIG. 3, the stream in line 101 is introduced into a tail gas coalescer 102 wherein additional sulfur is removed in line 104. Inlet process gas (stream 101) temperatures are in the range of about 260 to about 310° F. and the exit process gas temperature (stream 109) is in the range of about 90 to about 130° F. The residual stream in lines 106 and 107 is then introduced into a tail gas cleanup unit (TGCU) 109 where the bulk of the residual sulfur constituents of line 106 are recovered to meet sulfur emission environmental standards typically by conversion to hydrogen sulfide which is returned to the sulfur plant feed inlet 10. The majority of stream 107 after the TGCU unit 109 is sent to an incinerator burner 112 in the incinerator/stack system 6 that is fired with natural gas in line 108 and air in inlet line 110. The materials are then vented in stack 114, at an acceptable sulfur content level, as an effluent 116 to the atmosphere.

In the embodiment shown in FIG. 3, flow restriction device 118 is positioned between the tail gas clean up unit 109 and incinerator burner 112. The flow restriction device 118 restricts the flow of tail gas traveling to the incinerator burner 112. The restriction of flow results in an increase in pressure at the tail gas cleanup unit 109, the tail gas coalescer 102, the third catalytic reactor 88, second catalytic reactor 70, first catalytic reactor 52, first condenser 32, waste heat boiler 24 and reaction furnace 22. Increasing the restriction of flow by the flow restriction device 118 increases the operating pressure in each of the units in the first sulfur removal system 2 and the second sulfur removal system 4.

As shown in FIG. 3, sulfur plant feed stream in sulfur plant feed inlet 10 is provided at a first pressure monitored by first pressure monitoring device 7 corresponding to operating pressure of the amine acid gas unit or other acid gas providing plant (not shown). In embodiments of the present disclosure, the flow restriction device 118 restricts the flow of gas such that the second pressure monitored by second pressure monitoring device 8 is maintained to within 10%, within 5%, within 1%, or substantially equal to the first pressure monitored by first pressure monitoring device 7. In one embodiment, the second pressure is maintained at about 27 psia. A second pressure that more closely approximates the first pressure permits higher pressure operation of the first sulfur removal system 2 and the second sulfur removal system 4. As discussed in greater detail above, the flow restriction device 118 may be controlled by controller 122 based upon inputs of data corresponding to the first pressure monitored by first pressure monitoring device 7 and second pressure monitored by second pressure monitoring device 8 and providing control as a control signal or other control mechanism on control line 120 (see FIG. 2). In one embodiment, the controller 122 will configure the flow restriction device 118 to provide a pressure drop that provides a second pressure that is approximately the same as the first pressure.

Figure 4:
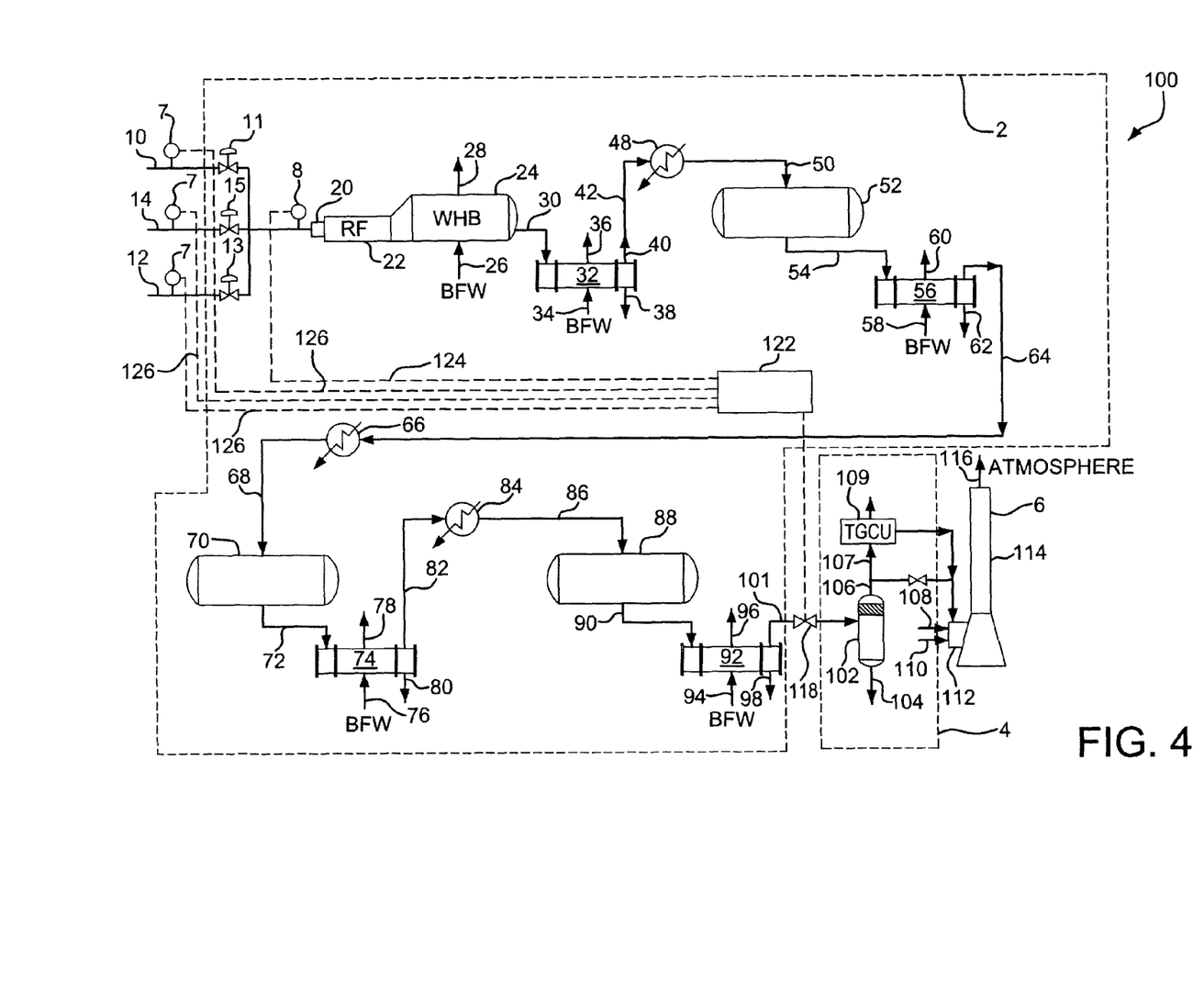
FIG. 4 shows a sulfur recovery unit system according to another embodiment of the present invention.

FIG. 4 shows an alternate embodiment of the present invention, wherein the arrangement of equipment is essentially the same as shown and described with respect to FIG. 3. However, FIG. 4 shows an alternate positioning of the flow restriction device 118 between the first sulfur removal system 2 and the second sulfur removal system 4. The flow restriction device 118 permits increased pressure in the first sulfur removal system 2 and not in the second sulfur removal system 4. In this embodiment, the effluent gas leaving the first sulfur removal system 2 has potential liquid sulfur and sulfur vapor plugging components, wherein the flow restriction device 118 may be designed to prevent sulfur solidification and subsequent mechanical failure. As in FIG. 3, the controller 122 provides a control signal or control mechanism to the flow restriction device 118 in response to the first pressure monitored in first pressure monitoring device 7 and the second pressure monitored in second pressure monitoring device 8.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A sulfur recovery system for recovering sulfur from a sulfur plant feed stream, the system comprising:
    a first sulfur removal system and a second sulfur removal system;
    a sulfur plant feed inlet to the first sulfur removal system, the sulfur plant feed inlet being capable of providing the sulfur plant feed stream at a first pressure;
    one or more oxidizing gas inlets arranged and disposed to combine at least one oxidizing gas stream with the sulfur plant feed stream to form a combustion gas for combustion in the first sulfur removal system at a second pressure; and
    a flow restriction device operably configured to control the operating pressure in one or both of the first sulfur removal system and the second sulfur removal system; wherein the flow restriction device is disposed downstream of first sulfur removal system.

2. The sulfur recovery system of claim 1, further comprising a controller, the controller being configured to modify the flow permitted through the flow restriction device in response to a signal relating to the first pressure and a signal relating to the second pressure.

3. The sulfur recovery system of claim 1, wherein the flow restriction device is configurable to maintain the second pressure within 10% of the first pressure.

4. The sulfur recovery system of claim 1, wherein the flow restriction device is configurable to maintain the second pressure within 5% of the first pressure.

5. The sulfur recovery system of claim 1, wherein the flow restriction device is configurable to maintain the second pressure substantially identical to the first pressure.

6. The sulfur recovery system of claim 1, wherein the sulfur plant feed inlet is arranged to provide an amine acid gas containing hydrogen sulfide.

7. The sulfur recovery system of claim 6, wherein the amine acid gas is provided by an amine gas unit.

8. The sulfur recovery system of claim 1, wherein the sulfur plant feed stream inlet is further capable of providing an additional sulfur-containing feed provided by a sour water stripper unit.

9. The sulfur recovery system of claim 1, wherein the first sulfur removal system includes a reaction furnace and at least one catalytic reactor.

10. The sulfur recovery system of claim 1, wherein the flow restriction device is disposed downstream of the second sulfur removal system.

11. The sulfur recovery system of claim 1, wherein the flow restriction device is disposed between the first sulfur removal system and the second sulfur removal system.

12. A gas processing plant, the plant comprising:
    a system for processing natural gas that produces natural gas and a sulfur plant feed stream;
    a sulfur recovery system for recovering sulfur from the sulfur plant feed stream, the system comprising:
        a first sulfur removal system and a second sulfur removal system;
        a sulfur plant feed inlet to the first sulfur removal system that receives the sulfur plant feed stream, the sulfur plant feed inlet being capable of providing the sulfur plant feed stream at a first pressure;
        one or more oxidizing gas inlets arranged and disposed to combine at least one oxidizing gas stream with the sulfur plant feed stream to form a combustion gas for combustion in the first sulfur removal system at a second pressure; and
        a flow restricting device downstream of the sulfur recovery system and operably configured to control an operating pressure in one or both of the first sulfur removal system and the second sulfur removal system.

13. The gas processing plant of claim 12, further comprising a controller, the controller being configured to modify the flow permitted through the flow restriction device in response to a signal relating to the first pressure and a signal relating to the second pressure.

14. The gas processing plant of claim 12, wherein the flow restriction device is configurable to maintain the second pressure within 10% of the first pressure.

15. The gas processing plant of claim 12, wherein the flow restriction device is configurable to maintain the second pressure within 5% of the first pressure.

16. The gas processing plant of claim 12, wherein the flow restriction device is configurable to maintain the second pressure substantially identical to the first pressure.

17. The gas processing plant of claim 12, wherein the sulfur plant feed inlet is arranged to provide an amine acid gas containing hydrogen sulfide.

18. The gas processing plant of claim 17, wherein the amine acid gas is provided by an amine gas unit.

19. The gas processing plant of claim 12, wherein the sulfur plant feed inlet is further capable of providing an additional sulfur-containing feed provided by a sour water stripper unit.

20. The gas processing plant of claim 12, wherein the first sulfur removal system includes a reaction furnace and at least one catalytic reactor.

21. A method for recovering sulfur from a sulfur containing stream, the method comprising:
    providing a first sulfur removal system and a second sulfur removal system;
    providing the sulfur containing stream at a first pressure;
    combining the sulfur containing stream with one or more oxidizing gases to form a combustion gas;
    combusting the combustion gas at a second pressure; and
    controlling an operating pressure in one or both of the first sulfur removal system and the second sulfur removal system downstream of the first sulfur removal system and in response to the first pressure and second pressure.

22. The method of claim 21, wherein the adjusting includes adjusting to maintain the second pressure within 10% of the first pressure.

23. The method of claim 21, wherein the adjusting includes adjusting to maintain the second pressure within 5% of the first pressure.

24. The method of claim 21, wherein the adjusting include adjusting to maintain the second pressure the second pressure substantially identical to the first pressure.

25. The method of claim 21 wherein the sulfur containing stream comprises a sulfur plant feed stream.

26. The method of claim 21 further comprising recovering elemental sulfur.

27. The system of claim 1 further comprising at least one monitoring device.

* * * * *